(12) United States Patent
Shames

(10) Patent No.: US 9,396,507 B2
(45) Date of Patent: Jul. 19, 2016

(54) MARKETING DEVICE AND USEFUL OBJECT HOLDER FOR USE IN AN AUTOMOBILE

(71) Applicant: Lisa Shames, Palos Verdes, CA (US)

(72) Inventor: Lisa Shames, Palos Verdes, CA (US)

(*) Notice: Subject to any disclaimer, the term of this patent is extended or adjusted under 35 U.S.C. 154(b) by 0 days.

(21) Appl. No.: 14/051,182

(22) Filed: Oct. 10, 2013

(65) Prior Publication Data

US 2014/0108301 A1    Apr. 17, 2014

Related U.S. Application Data

(60) Provisional application No. 61/712,434, filed on Oct. 11, 2012.

(51) Int. Cl.
| | | |
|---|---|---|
| *B60R 7/06* | (2006.01) | |
| *G06Q 99/00* | (2006.01) | |
| *B60N 3/00* | (2006.01) | |
| *B60R 7/12* | (2006.01) | |
| *G09F 21/04* | (2006.01) | |

(52) U.S. Cl.
CPC ........ *G06Q 99/00* (2013.01); *B60N 3/00* (2013.01); *B60R 7/06* (2013.01); *B60R 7/12* (2013.01); *G09F 21/04* (2013.01)

(58) Field of Classification Search
CPC .................................... B60R 7/06; B60R 7/12
USPC ..................... 40/643, 594, 95, 358
See application file for complete search history.

(56) References Cited

U.S. PATENT DOCUMENTS

| | | | |
|---|---|---|---|
| 2,914,873 A | 12/1959 | Brennan | |
| 3,734,816 A | 5/1973 | Swasey | |
| 3,952,133 A | 4/1976 | Amos et al. | |
| 4,034,910 A * | 7/1977 | Rogers | 229/68.1 |
| D378,333 S * | 3/1997 | Anderson | D6/632 |
| 5,622,761 A | 4/1997 | Cole | |
| 6,155,469 A | 12/2000 | Johnson et al. | |
| 6,237,267 B1 * | 5/2001 | Lackomar | 40/593 |
| 6,244,400 B1 * | 6/2001 | Bowers | 190/110 |
| 6,403,189 B1 | 6/2002 | Donahue | |
| 6,482,487 B1 | 11/2002 | Donahue | |
| 6,899,934 B2 | 5/2005 | Beyer | |
| 6,986,422 B2 | 1/2006 | Boatwright | |
| 7,086,559 B2 | 8/2006 | Poole | |
| 7,150,575 B1 * | 12/2006 | Minehart | 401/131 |

(Continued)

FOREIGN PATENT DOCUMENTS

| | | | |
|---|---|---|---|
| JP | 2001220560 A | | 2/2000 |
| JP | 3081279 U | | 4/2001 |

(Continued)

*Primary Examiner* — Gary Hoge

(74) *Attorney, Agent, or Firm* — Koppel, Patrick, Heybl & Philpott

(57) ABSTRACT

A marketing device that also functions as a useful object holder in an automobile is described herein. The marketing device can be placed on or attached to a prominent viewing position in the vehicle within easy reaching distance. The device can be placed on or attached securely so that the device will remain substantially in place during movement of the automobile. The device can have one or more dedicated areas for holding a useful object and marketing means. The dedicated areas can allow for free removal or placement of the useful device and marketing means. The useful object can draw the attention of an individual, causing repeated exposure to the marketing means and increasing the effectiveness of the marketing means.

17 Claims, 1 Drawing Sheet

(56) References Cited

U.S. PATENT DOCUMENTS 7,568,301 B1 * 8/2009 Zemlansky et al. ............ 40/358
7,923,088 B2    4/2011 Wheatley
2012/0247989 A1 * 10/2012 Cooper .......................... 206/320

FOREIGN PATENT DOCUMENTS

| JP | 3081280 U | 4/2001 |
| JP | 2004160934 A | 11/2002 |
| WO | WO 03104347 | 12/2003 |

* cited by examiner

MARKETING DEVICE AND USEFUL OBJECT HOLDER FOR USE IN AN AUTOMOBILE

CROSS REFERENCE TO RELATED APPLICATIONS

This application claims the benefit of U.S. Provisional Application Ser. No. 61/712,434 to Lisa Shames, entitled Marketing Device and Useful Object Holder for Use in an Automobile, filed on Oct. 11, 2012, which is hereby incorporated herein in its entirety by reference, including the drawings, charts, schematics, diagrams and related written description.

BACKGROUND OF THE INVENTION

1. Field of the Invention

The present invention relates to devices for marketing which possess a useful function, for example, a marketing device providing a device for holding a useful object in an automobile.

2. Description of the Related Art

Marketing and advertising are cornerstones of the economy, which are used by businesses and individuals to promote themselves and their products. Particularly, in the field of self-marketing, individuals such as realtors, insurance agents and salesman create portable marketing objects or devices with a useful function that are given away; the intention of this being that an individual will regularly use the device and view the marketing material portions.

An example of such a device would be a pad of paper with a realtor's picture and contact information printed at the top of each page. When an individual writes something on the pad of paper, he or she views the realtor's information. If an individual has such a pad of paper out in plain view, or if the individual uses it to write a note to another person, even more people view the realtor's information. However, marketing devices such as these are typically mass-produced, and once created are fixed and unalterable (e.g. once a realtor's picture is put on a pad of paper, another realtor cannot alter the pad and use their picture without a whole new pad being manufactured). Managers of sales teams who order such devices for their employees in bulk will be left with "junk inventory" should an employee change positions. Likewise, if one is promoting themselves and their contact information or resume changes, he or she would have to dispose of the device containing the outdated information and order a new stock of the devices. While simple pads of paper may be relatively inexpensive, other more complex marketing devices may not be, resulting in unnecessary expenses.

The above devices also cannot fully capitalize on the environment of an automobile. Many people spend a significant portion of their day in an automobile. Additionally, many people will travel places with friends and family and go out to lunch with co-workers. However, devices such as the pad of paper above cannot be displayed prominently due to the structure and motion of a vehicle and thus are not sufficiently or regularly seen or used by the driver or passengers.

SUMMARY OF THE INVENTION

Described herein is a marketing device that also functions as a useful object holder, for example, in an automobile. The marketing device can be placed on or attached to a prominent viewing position in the vehicle such as the dashboard, a portion of one of the doors, one of the sun-visors, or a vertical or horizontal portion of the vehicle within easy reaching distance. The device can be placed on or attached to the prominent viewing area securely so that the device will remain substantially in place. The device can have a dedicated area for holding a useful object or objects, such as a pen and pad of paper, and/or a dedicated area for holding or displaying a marketing means such as a business card. The device can also have separate dedicated areas wherein at least one dedicated area holds a useful object or objects and at least one other dedicated area holds or displays a marketing means. The dedicated area(s) can allow for free removal or placement of a useful device and/or marketing means or can provide for permanent attachment.

One embodiment of a marketing device incorporating features of the present invention comprises a body having at least a front surface and a back surface, wherein the back surface comprises an attachment structure, at least one dedicated marketing area on the body, wherein the at least one dedicated marketing area is arranged to accept a marketing means, and at least one dedicated utility area on the body.

Another embodiment of a marketing device incorporating features of the present invention comprises a body, at least one dedicated marketing area on the body, wherein the dedicated marketing area is arranged to accept a marketing means such that the marketing means can be freely removed and replaced without damaging the marketing device, and at least one dedicated utility area on the body.

Still another embodiment of a marketing device incorporating features of the present invention comprises a body having a front surface and a back surface, with the back surface comprising an attachment structure, a dedicated marketing area on the front surface of the body, wherein the dedicated marketing area comprises a raised border having sufficient dimensions to hold in place a business card having a size of 3.5×2 inches, a first dedicated utility area on the front surface of the body, the first dedicated utility area comprising a raised border having sufficient dimensions to accommodate a pad of paper, and a second dedicated utility area on the front surface of the body, wherein the second dedicated utility area comprises a raised border having sufficient dimensions to accommodate a writing instrument.

These and other further features and advantages of the invention would be apparent to those skilled in the art from the following detailed description, taking together with the accompanying drawings, in which:

DETAILED DESCRIPTION OF THE INVENTION

Figure 1:
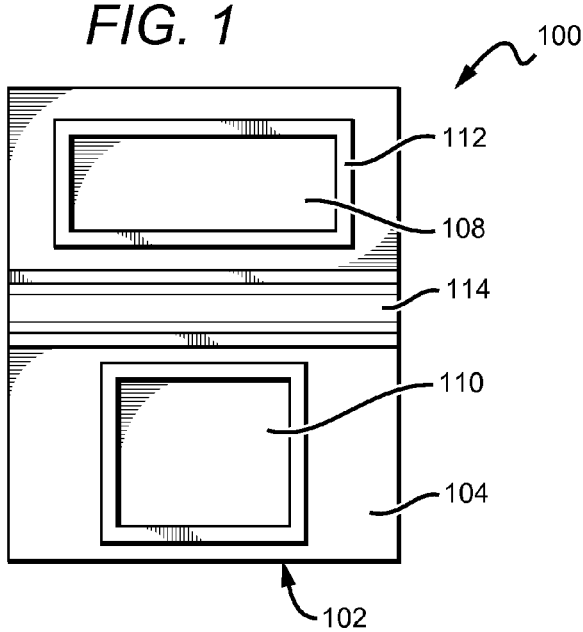
FIG. 1 is a front view of an embodiment of a marketing device according to the present invention.

Marketing devices according to the present disclosure can comprise a body, one or more dedicated marketing areas and one or more dedicated utility areas. The body can comprise front and back surfaces and can be made of many different materials as is set forth in greater detail below.

The dedicated marketing area can be arranged to receive one or more marketing means. In some embodiments, the dedicated marketing area can be arranged such that the marketing means are freely removable and replaceable. This arrangement can lessens the chances of a company being stuck with "junk" inventory as will be discussed in further detail below. These embodiments and further embodiments are set forth in greater detail below.

The dedicated utility means can be arranged to hold various useful objects in place. This also increases the amount by which a user is exposed to the marketing means, increasing its effectiveness. This arrangement is discussed in further detail below.

Throughout this description, the preferred embodiment and examples illustrated should be considered as exemplars, rather than as limitations on the present invention. As used herein, the term "invention," "device," "present invention" or "present device" refers to any one of the embodiments of the invention described herein, and any equivalents. Furthermore, reference to various feature(s) of the "invention," "device," "present invention" or "present device" throughout this document does not mean that all claimed embodiments or methods must include the referenced feature(s).

It is also understood that when an element or feature is referred to as being "on" or "adjacent" another element or feature, it can be directly on or adjacent the other element or feature or intervening elements or features may also be present. Furthermore, relative terms such as "outer", "above", "lower", "below", and similar terms, may be used herein to describe a relationship of one feature to another. It is understood that these terms are intended to encompass different orientations in addition to the orientation depicted in the figures.

It is also understood that when an element is referred to as being "connected," "attached" or "coupled" to another element, it can be directly connected, attached or coupled to the other element or intervening elements may be present. In contrast, when an element is referred to as being "directly connected," "directly attached" or "directly coupled" to another element, there are no intervening elements present.

As used herein the term "marketing means" can include any form of promotional and/or identifying mark or depiction for a business, group and/or individual or for products, goods and/or services offered, rendered, made, distributed and/or sold by a business, group and/or individual. Such "marketing means" can be any word, phrase, graphical depiction, video or photo that allows or promotes an individual to think of and consider the person, group, product, object, place and/or business the "marketing means" is promoting. The term "marketing means" includes but is not limited to: business cards, stickers, etchings, printings, embossments, resumes, advertisements, product or company names, logos, symbols, photos, drawings or pictures.

As used herein the term "useful object" or "useful device" can include any object having a useful function including but not limited to: a writing instrument, a pad of paper, a calculator, a cell phone/smart phone, and/or a portable computer or tablet (particularly as technology improves and such devices become smaller). The term "useful object" or "useful device" can also include any object that an individual can interact with or that can draw the attention of an individual to the object.

Although the terms first, second, etc. may be used herein to describe various elements or components, these elements or components should not be limited by these terms. These terms are only used to distinguish one element or component from another element or component. Thus, a first element or component discussed below could be termed a second element or component without departing from the teachings of the present invention.

Embodiments of the invention are described herein with reference to different views and illustrations that are schematic illustrations of idealized embodiments of the invention. As such, variations from the shapes of the illustrations as a result, for example, of manufacturing techniques and/or tolerances are expected. Embodiments of the invention should not be construed as limited to the particular shapes of the regions illustrated herein but are to include deviations in shapes that result, for example, from manufacturing.

FIG. 1 shows a front view of an embodiment of a marketing device 100 according to the present invention. Marketing device 100 comprises a body 102 having a front surface 104 and a back surface 106 (shown in FIG. 2), at least one dedicated marketing area 108 on front surface 104, and at least one dedicated utility area 110 on front surface 104 (although dedicated marketing area 108 and dedicated utility area 110 can be the same area, as will be discussed further below). Body 102 can comprise a variety of materials including but not limited to: resin, rubber, vinyl, polyurethane, polyvinyl chloride (PVC), polystyrene foam, polymers/copolymer substances, acrylic substances, plastic, leather, metal, wood, cloth or a combination thereof, with the preferred material being a material that is flexible and inexpensive to produce and obtain. Body 102 can comprise a laminate structure of multiple layers of the same or varying materials.

Front surface 104 can comprise an adhesive "sticky" or "tacky" surface to assist in the placement and/or holding of useful objects and/or marketing means. The "sticky" or "tacky" surface can be formed by applying an adhesive substance or coating to front surface 104, with the preferred adhesive substance being a pressure sensitive adhesive that allows objects to be held in place or removed without significantly damaging the object or front surface 104. Alternatively, or in addition to the use of an adhesive coating, the "sticky" or "tacky" surface can be created by selecting a material for body 102 that has adhesive properties or by chemically or mechanically altering front surface 104 such that it has adhesive properties and can chemically or mechanically cling to or grip objects. Additionally, another adhesive material layer may be put on front surface 104 to provide the "sticky" or "tacky" function. Furthermore, front surface 104 can have a uniform level of "stickiness" or varying levels of "stickiness" across its surface.

Front surface 104 can also comprise a high friction surface to prevent or discourage useful objects and/or marketing means from moving when placed on or attached to marketing device 100. This surface can be formed by chemically or mechanically altering, roughening or etching front surface 104 to increase the frictional forces between front surface 104 and a useful object and/or marketing means. Front surface 104 can have a uniform level of friction or varying levels of friction across its surface. In embodiments where a specific type of object is desired to be utilized with marketing device 100, a material with a higher coefficient of friction relative to the material of the desired object can be chosen as the material body 102 comprises.

Dedicated marketing area 108 can comprise a raised border 112. Raised border 112 can define a portion of dedicated marketing area 108 which accommodates the dimensions of an intended marketing means, such that raised border 112 can hold the marketing means in place. For example, in embodiments where a business card is the intended marketing means, raised border 112 can form a perimeter to accommodate a standard business card size of 3.5×2 inches. Alternatively or in addition to raised border 112, dedicated marketing area 108 can comprise a recessed area. In this embodiment, the edges of the recessed area can perform substantially the same function as raised border 112. In another embodiment, dedicated marketing area 108 can comprise a raised plateau to assist in the display of a marketing means.

One advantage of using raised border 112 to hold a marketing means in place is that the marketing means is held securely in place while still being freely removable. This would allow a company with employees such as salesmen to purchase marketing device 100 in bulk and distribute the devices to the salesmen for use in promoting the company, while not permanently altering marketing device 100. This prevents scenarios wherein a device with a particular employee's information permanently fixed to the device is ordered in bulk, resulting in the company being stuck with "junk" inventory should the employee cease working for the company. Likewise, individuals involved in self-marketing, including realtors, insurance agents, models, or individuals seeking employment, can purchase marketing device 100 in bulk and freely update the marketing means to include the most current biographical information pertaining to the individual (e.g. resume, contact information). Additionally, the type of marketing means can be adjusted as needed. For example, a business card can be replaced with a photograph.

It is noted that raised border 112 is not the only structure according to the present disclosure which enables a marketing means to be freely removable from dedicated marketing area 108. Dedicated marketing area 108 can comprise any surface that promotes placement or attachment of a marketing means while allowing the marketing means to be freely removable. For example, dedicated marketing area 108 can comprise a surface complementary to adhesives used by logo/advertisement-based stickers such that the stickers can stick to dedicated marketing means 108, yet be easily removed when desired without substantially damaging dedicated marketing area 108 and/or the stickers.

In situations where an individual desires permanent attachment of a marketing means, for example, to prevent someone to whom marketing device 100 is given from removing the marketing means, the attachment can be made permanent prior to giving the device to an individual by various means known in the art including but not limited to a permanent adhesive or lamination.

Dedicated marketing area 108 can accept a semi-permanent marketing means such as a sticker or removable decal. The term semi-permanent marketing means includes any marketing means that is removable without substantially altering or deforming marketing device 100. For example, semi-permanent marketing means do not include etching, embossing or permanently printing directly on marketing device 100 itself. Semi-permanent marketing means do include stickers, such as stickers displaying business or personal information, logos, photographs, etc.

Dedicated utility area 110 functions similarly to dedicated marketing area 108 and can utilize the same materials, alterations, recessed portions, raised borders and other disclosed embodiments as dedicated marketing area 108 above; dedicated utility area 110 can also function the same way as dedicated marketing area 108. Dedicated utility area 110, however, is designed to receive a useful object, for example, a pad of paper or pad of sticky notes. A second (or multiple) dedicated utility area 114 can be formed on front surface 104 and can have the same or different dimensions as dedicated utility area 110. In one embodiment, dedicated utility area 110 is configured or arranged to receive a pad of sticky notes and second dedicated utility area 114 is configured or arranged to receive a writing instrument. Like dedicated marketing area 108, dedicated utility area 110 can securely hold a useful object and can allow for the object to be freely removed and replaced.

There are embodiments in which the marketing means itself is the useful object, for example where a pad of paper has the picture and contact information of an individual interested in self-promotion. In these scenarios, dedicated marketing area 108 and dedicated utility area 110 can be the same single area. It is not necessary that there be more than one dedicated area on front surface 104.

Figure 2:
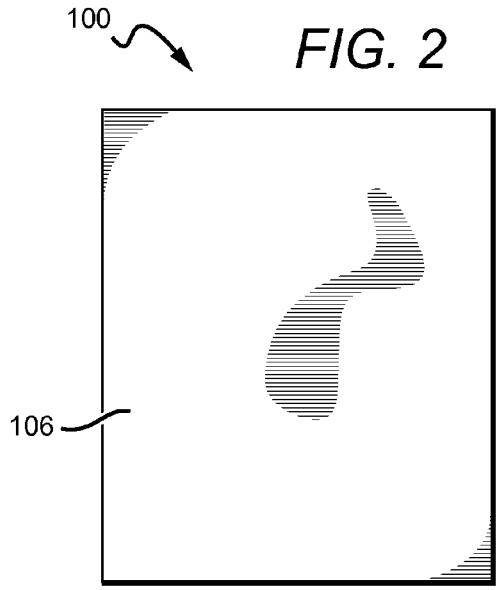
FIG. 2 is a back view of the marketing device of FIG. 1.

FIG. 2 shows a back view of marketing device 100. Back surface 106 can comprise an attachment structure for attaching marketing device 100 to a surface in an automobile, such as the dashboard of a car. Such an attachment structure can comprise a sticky or frictional surface as discussed above in regard to front surface 104, or can comprise any number of attachment structures known in the art, including but not limited to: suction cups, hooks, gripping mechanisms and adhesive tape.

Figure 3:
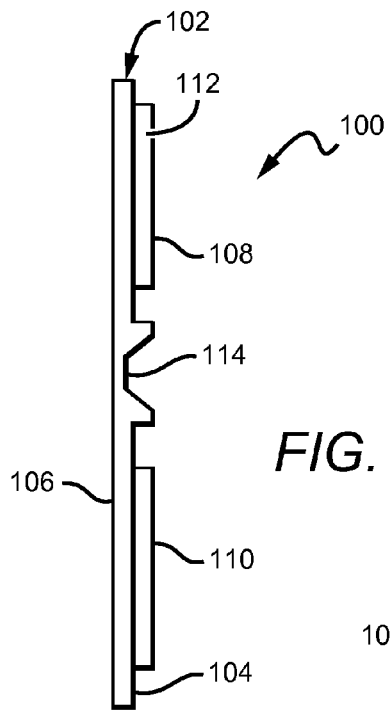
FIG. 3 is a vertical side view of the marketing device of FIG. 1.
Figure 4:
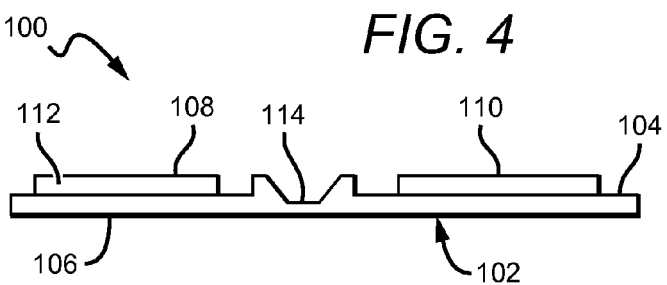
FIG. 4 is a horizontal side view of the marketing device of FIG. 1.

FIGS. 3-4 show vertical and horizontal views of marketing device 100 respectively. Marketing device 100 can be configured or arranged to support the weight of a marketing means and/or a useful object such that marketing device 100 can be attached to or placed on a completely or substantially vertical surface of an automobile. Such arrangements and configurations to support a vertical orientation under the weight of such objects include but are not limited to use of certain materials, use of certain adhesives and/or use of certain shapes/designs.

Additional advantages of devices according to the present disclosure include that such devices provide easy access to useful objects in an automobile. For example, a freely attachable, but securely held (even in the mobile environment of an automobile) pen and pad of paper would be convenient. The useful object element can draw the attention of an individual, causing repeated exposure to and increasing the effectiveness of the marketing means. The prominent display of the marketing means in an automobile, especially coupled with the novelty of the marketing device, can attract notice from passengers in the automobile, and along with exposure to the marketing means, can potentially elicit questions from the passenger to the driver about who provided the marketing device to the driver, thus increasing marketing effectiveness.

Although throughout this disclosure, many marking device embodiments herein are discussed in reference to their use in an automobile, it is understood that these marketing devices can be utilized in other situations. For example, marketing devices incorporating features of the present invention can be used in conjunction with other surfaces such as tables, counters, floors, ceiling, walls and doors.

Although the present invention has been described in detail with reference to certain preferred configurations thereof, other versions are possible. Therefore, the spirit and scope of the invention should not be limited to the versions described above.

I claim:

1. A marketing device comprising:
    A planar body, said planar body comprising at least a front surface and a back surface, said back surface comprising an attachment structure, said front surface comprising a high friction surface and comprising varying levels of friction across its surface;
    at least one dedicated marketing area on said front surface; and
    at least one dedicated utility area on said front surface, said at least one utility area comprising a raised border configured to accommodate the dimensions of a useful object, such that said raised border conforms to said object.

2. The marketing device of claim 1, wherein said body comprises a flexible material.

3. The marketing device of claim 1, wherein said at least one dedicated marketing area and said at least one dedicated utility area are different areas of said planar body.

4. The marketing device of claim 1, wherein said front surface comprises a sticky or tacky surface.

5. The marketing device of claim 1, wherein said at least one dedicated marketing area comprises a raised border.

6. The marketing device of claim 5, wherein said raised border is configured such that said marketing means is freely removable.

7. The marketing device of claim 1, wherein said marketing device is configured such that it can be placed on a vertical surface while securely holding a useful object.

8. The marketing device of claim 1, wherein said at least one dedicated marketing area is configured to accept a semi-permanent marketing means.

9. The marketing device of claim 1, wherein said attachment structure comprises a sticky surface.

10. A marketing device comprising:
    a body;
    at least one dedicated marketing area on said body, said dedicated marketing area arranged to accept a marketing means comprising a front surface, said front surface comprising a high friction surface and comprising varying levels of friction across its surface, said at least one dedicated marketing area configured such that said marketing means can be freely removed and replaced without damaging said marketing device and such that the entire front surface of said marketing means is visible and uncovered by said marketing device; and
    at least one dedicated utility area on said body.

11. The marketing device of claim 10, wherein said body comprises a flexible material.

12. The marketing device of claim 10, wherein said body comprises a sticky or tacky surface.

13. The marketing device of claim 10, wherein said dedicated utility area comprises a raised border configured to accommodate the dimensions of a useful object.

14. The marketing device of claim 10, wherein said at least one dedicated marketing area is configured to accept a semi-permanent marketing means.

15. A marketing device comprising:
    a body, said body comprising a front surface and a back surface, said back surface comprising an attachment structure and said front surface comprising a high friction surface and comprising varying levels of friction across its surface;
    a dedicated marketing area on said front surface of said body, said dedicated marketing area comprising a raised border having sufficient dimensions to hold in place a business card having a size of 3.5×2 inches, such that said raised border conforms to and surrounds said business card;
    a first dedicated utility area on said front surface of said body, said first dedicated utility area comprising a raised border having sufficient dimensions to accommodate a pad of paper; and
    a second dedicated utility area on said front surface of said body, said second dedicated utility area comprising a raised border having sufficient dimensions to accommodate a writing instrument.

16. The marketing device of claim 15, wherein said second dedicated utility area is on said front surface between said dedicated marketing area and said first dedicated utility area.

17. The marketing device of claim 15, wherein said raised border is arranged such that said business card can be freely removed without damaging said marketing device.

\* \* \* \* \*